United States Patent
Cam-Winget et al.

(10) Patent No.: US 7,882,349 B2
(45) Date of Patent: *Feb. 1, 2011

(54) INSIDER ATTACK DEFENSE FOR NETWORK CLIENT VALIDATION OF NETWORK MANAGEMENT FRAMES

(75) Inventors: Nancy Cam-Winget, Mountain View, CA (US); Mark Krischer, Pymble (AU); Robert B. O'Hara, Jr., Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1296 days.

This patent is subject to a terminal disclaimer.

(21) Appl. No.: 11/295,334

(22) Filed: Dec. 6, 2005

(65) Prior Publication Data

US 2009/0327736 A1 Dec. 31, 2009

Related U.S. Application Data

(63) Continuation-in-part of application No. 11/029,987, filed on Jan. 5, 2005, now Pat. No. 7,558,960, which is a continuation-in-part of application No. 10/687,075, filed on Oct. 16, 2003, now abandoned.

(51) Int. Cl.
*H04L 29/06* (2006.01)
*H04L 9/32* (2006.01)
*G06F 9/00* (2006.01)

(52) U.S. Cl. .................... 713/160; 713/178; 713/181; 726/13

(58) Field of Classification Search ................ 713/170, 713/171, 181, 160, 178; 726/13
See application file for complete search history.

(56) References Cited

U.S. PATENT DOCUMENTS

| | | | | |
|---|---|---|---|---|
| 5,440,633 | A * | 8/1995 | Augustine et al. | 713/161 |
| 6,775,804 | B1 * | 8/2004 | Dawson | 714/776 |
| 6,782,503 | B1 * | 8/2004 | Dawson | 714/739 |
| 6,804,257 | B1 * | 10/2004 | Benayoun et al. | 370/471 |
| 6,965,674 | B2 | 11/2005 | Whelan et al. | |
| 6,996,712 | B1 * | 2/2006 | Perlman et al. | 713/161 |
| 7,024,553 | B1 | 4/2006 | Morimoto | |
| 7,096,359 | B2 * | 8/2006 | Agrawal et al. | 713/168 |
| 7,292,842 | B2 | 11/2007 | Suzuki | |
| 7,376,235 | B2 * | 5/2008 | Kuehnel | 380/267 |
| 7,415,652 | B1 * | 8/2008 | Szeremi | 714/758 |
| 2003/0177391 | A1 | 9/2003 | Ofek et al. | |

(Continued)

OTHER PUBLICATIONS http://wwwv.tech-faq.com/wireless-networks/rsn-robust-secure-network.shtml, "What is RSN (Robust Secure Network)?", Sep. 2, 2004.

(Continued)

*Primary Examiner*—Nasser Moazzami
*Assistant Examiner*—Mohammad W Reza
(74) *Attorney, Agent, or Firm*—Tucker Ellis & West LLP

(57) ABSTRACT

Method for detecting an attack on a broadcast key shared between an access point and its wireless clients. Upon detection of the attack, actions are implemented to react to the attack as defined in one or more security policies. Detection of the attack is achieved by examining both a link message integrity check and an infrastructure management frame protection (IMFP) message integrity check contained in a broadcast management frame.

15 Claims, 10 Drawing Sheets

U.S. PATENT DOCUMENTS

| | | | |
|---|---|---|---|
| 2003/0185239 A1* | 10/2003 | Miller et al. | 370/474 |
| 2003/0204717 A1* | 10/2003 | Kuehnel | 713/150 |
| 2004/0006705 A1 | 1/2004 | Walker | |
| 2004/0047308 A1* | 3/2004 | Kavanagh et al. | 370/328 |
| 2004/0078598 A1 | 4/2004 | Barber et al. | |
| 2004/0107366 A1 | 6/2004 | Belfanz et al. | |
| 2004/0203764 A1 | 10/2004 | Hrastar et al. | |
| 2004/0240412 A1 | 12/2004 | Winget | 370/331 |
| 2005/0015471 A1 | 1/2005 | Zhang et al. | |
| 2005/0141498 A1 | 6/2005 | Cam-Winget et al. | |
| 2005/0149764 A1* | 7/2005 | Bahl et al. | 713/202 |
| 2007/0195830 A1* | 8/2007 | Lorek et al. | 370/503 |
| 2008/0295144 A1 | 11/2008 | Cam-Winget | |

OTHER PUBLICATIONS http://www.eetimes.com/printableArticle.jhtml?doc_id=OEG20021126S0003&_requestid=..., "Diving into the 802.11iSpec: A Tutorial", Sep. 2, 2004.

Notification of Transmittal of the International Search Report and the Written Opinion of the International Searching Authority, or the Declaration; PCT/US06/61576 dated Jul. 21, 2008; 12 pages.

Arbaugh et al., "Your 802.11 Wireless Network has no Clothes", 2001, University of Maryland, pp. 1-13.

Bernard Aboba, "IEEE 802.11Pre-Authentication," XP-002339240, Jun. 17, 2002, pp. 1-47.

Congdon et al., "IEEE 802.11 RADIUS Usage Guidelines", NWG, p. 1-30.

Gast, Matthew, "802.11 Wireless Networks, The Definitive Guide", Oreielly, 2002, chapters 2, 4, 6, 7, and 14.

Cisco Technology Administration, "Wireless LAN Security", Feb. 6, 2001.

Cisco Technology Administration, "Wireless LAN Security in Depth", Jan. 15, 2002.

Cisco Technology Administration, "A Comprehensive Review of 802.11 Wireless LAN Security", Aug. 27, 2002.

TECH FAQ, "What is RSN (Robust Secure Network)", Sep. 2, 2004.

Dennis Eaton, "Diving into the 802.11 Spec: A Tutorial", Nov. 26, 2002.

* cited by examiner

INSIDER ATTACK DEFENSE FOR NETWORK CLIENT VALIDATION OF NETWORK MANAGEMENT FRAMES

CROSS-REFERENCE TO RELATED APPLICATIONS

This application is a continuation-in-part application of U.S. patent application Ser. No. 11/029,987, entitled "Network Infrastructure Validation of Network Management Frames", which was filed on Jan. 5, 2005 now U.S. Pat. No. 7,558,960 which in turn is a continuation-in-part application of U.S. patent application Ser. No. 10/687,075, entitled "System and Method for Protecting Network Management Frames", which was filed on Oct. 16, 2003 now abandoned—both of which are herein incorporated by reference.

BACKGROUND

The IEEE (Institute of Electrical and Electronic Engineers) 802.11 standard provides guidelines for allowing users to wirelessly connect to a network and access basic services provided therein. It has become more evident in recent years that security and controlled access are necessities in light of the large amount of sensitive information that is communicated over networks today.

Traditionally, the security and controlled access efforts of wireless networking, and more specifically of layer 2 and the 802.11 MAC protocol have been directed toward protecting the data content of the transmission and not toward the prevention of session disruption. In other words, prior efforts have only been directed toward protecting the sensitivity of the content of the data transmitted and not toward the protection of the transmission of management frame packets which control the session integrity and quality.

Of course, access to a network can be restricted by any number of methods, including user logins and passwords, network identification of a unique identification number embedded within the network interface card, call-back schemes for dial-up access, and others. These conventional protection schemes are directed toward controlling the overall access to the network services and toward protecting the data transmissions.

Unfortunately, identifying information contained within the management frames transmitted via a network (e.g. IEEE 802.11 network) has not been the focus of protection in traditional security schemes. U.S. patent application Ser. No. 10/687,075, filed on Oct. 16, 2003, the disclosure of which is hereby incorporated by reference herein, discloses a method for protecting the authenticity and integrity of network management frames (for example 802.11 management frames) by providing message authentication checks and replay protection within a given security context. However, it does not fully provide a solution to the specific problem of establishment of the security context. This lack of protection leaves a network vulnerable to attacks whereby an attacker, such as a rogue access point, can spoof Access Point management frames. For example, a rogue access point (AP), which may possibly be a member of a group that has gone rogue, can initiate an attack on one or more stations within a network by sending them a spoofed deauthenticate (DEAUTH) or disassociation request, at which point the client will politely disconnect from their original AP and begin to roam, sometimes roaming to the rogue AP which sent the spoofed request. Additionally, the client side is more vulnerable to attack than the infrastructure side, and yet both have access to the broadcast key. Further, if the attacker is in fact, a legitimate client, the "vulnerability" of the client is not necessarily an issue. Therefore, the risk comes from an "attacker" with possession of the broadcast key—either by being a legitimate client, or by successfully attacking a legitimate client—can then possibly spoof a legitimate access point's broadcast message. The possible scenario of such an attack would be a broadcast disassociate or deauthenticate request.

The foregoing examples of the related art and limitations related therewith are intended to be illustrative and not exclusive. Other limitations of the related art will become apparent to those of skill in the art upon a reading of the specification and a study of the drawings.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, a wireless access point having at least one link key for securing management frames transmitted to at least one wireless client. The wireless access point is further configured with at least one infrastructure management frame protection (IMFP) key. A method comprises composing a wireless management frame for transmission to one or more wireless clients. The method comprises generating a first message integrity check (MIC) with at least one link key corresponding to the one or more wireless clients. The method comprises appending the first MIC to the wireless management frame. The method also comprises generating a second message integrity check (MIC) with the IMPF key. The method comprises appending the second MIC to the wireless management frame. The method comprises transmitting the wireless management frame to the one or more wireless clients.

In accordance with an example embodiment, there is disclosed herein, a wireless access point having at least one link key for securing management frames transmitted to one or more wireless clients, the wireless access point further configured with at least one infrastructure management frame protection (IMFP) key. The wireless access point comprises a wireless network infrastructure, one or more processors, and a memory. The wireless access point also comprises a wireless access point application stored in the memory. The wireless access point application includes instructions operable to cause the one or more processors and the wireless network infrastructure to compose a wireless management frame for transmission to one or more wireless clients. The instructions are further operable to generate a first message integrity check (MIC) with at least one link key corresponding to the one or more wireless clients. The instructions are operable to append the first MIC to the wireless management frame. The instructions are further operable to generate a second message integrity check (MIC) with the IMFP key. The instructions are operable to append the second MIC to the wireless management frame. The instructions are operable to transmit the wireless management frame to the one or more wireless clients.

In accordance with an example embodiment, there is disclosed herein, a wireless access point having at least one link key securing management frames transmitted to at least one wireless client, the wireless access point further configured with at least one infrastructure management frame protection (IMFP) key. The wireless access point comprises means for composing a wireless management frame for transmission to one or more wireless clients. The wireless access point comprises means for generating a first message integrity check (MIC) with at least one link key corresponding to the one or more wireless clients. The wireless access point also comprises means for appending the first MIC to the wireless management frame. The wireless access point comprises means for generating a second MIC with the IMFP key. The wireless access point comprises means for appending the second MIC to the wireless management frame. The wireless access point also comprises means for transmitting the wireless management frame to the one or more wireless clients.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, tools and methods which are meant to be exemplary and illustrative, not limiting in scope.

An embodiment by way of non-limiting example discloses a method for use in a wireless access point that has at least one link key for securing management frames transmitted to at least one wireless client, the wireless access point further configured with at least one infrastructure management frame protection (IMFP) key. The method includes composing a wireless management frame for transmission to one or more wireless clients and generating a first message integrity check (MIC) with at least one link key corresponding to the one or more wireless clients. A first MIC information element (IE) is appended to the wireless management frame and a second MIC is generated with the IMFP key. Finally, the second MIC is appended to the wireless management frame in an IE, and the wireless management frame is transmitted to the one or more wireless clients.

Throughout this description, the preferred embodiment and examples shown should be considered as exemplars, rather than limitations, of the claimed embodiments. The claimed embodiments provide a detection-based defense to a wireless network. Elements of the infrastructure, e.g., access points or scanning-only access points or other components (e.g., Infrastructure nodes) on the network, detect possible rogues or intruders by detecting spoofed frames, such as from rogue access points. Access points and other elements of the infrastructure include a signature, such as a management frame protection information element (MFP IE), with their management frames in a manner that enables neighboring access points or other network components, such as dedicated detectors, to be able to validate the management frames, and to detect spoofed frames.

Figures 1, 2:
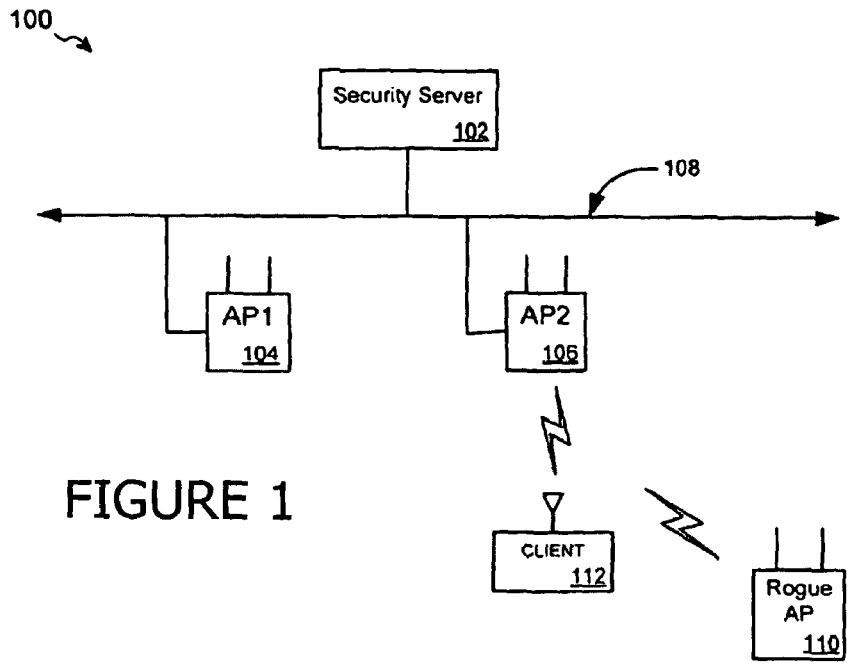
FIG. 1 is a block diagram of a network configured to implement various aspects of the claimed embodiments.
FIG. 2 is an example information element for a management frame protection information element (MFP IE) in accordance with an exemplary embodiment.

Referring to FIG. 1, there is illustrated a network 100 in accordance with an exemplary embodiment. The network 100 comprises a security server, such as a wireless domain server (WDS), 102 for performing key management and other security functions on network 100 such as authenticating access points 104, 106 and client 112. A wireless domain server may be suitably adapted to function as security server 102 with the capability to perform the authentication itself, or be coupled to a security server, or authentication server, such as a RADIUS server (not shown), for performing these functions. Access points AP1 104 and AP2 106 are connected to wireless domain server 102 via a secure backbone 108. Backbone 108 comprises at least one of a wired and wireless segment. The example illustrated in FIG. 1, also shows a rogue AP 110. AP2 106 is situated such that it can receive signals sent by AP1 104 and rogue AP 110. However, as will be illustrated herein infra, the claimed embodiments do not require that AP 106 needs to be in receiving range of AP 104 to determine whether packets sent by rogue AP 110 are spoofed.

In accordance with an aspect of the claimed embodiments, when AP2 106 receives a management frame sent by AP1 104, AP2 106 obtains a key for AP1 104. AP2 106 sends a message on backbone 108 to security server 102 requesting the key for AP1 104. Alternatively, AP1 104, upon being authenticated by security server 102 can send the key to neighboring access points, such as AP2 106, via backbone 108. The management frame is then validated by AP2 106 using the key for AP1 104.

As used herein management frames, such as for an 802.11 network, include but are not limited to beacons, probe requests, probe responses, association responses, disassociation requests, reassociation requests, 802.11 Task Group E (TGe) action frames, 802.11 Task Group h (TGh) action frames, 802.11 Task Group k (TGk) action frames, authentication responses and deauthentication requests. The management frame contains an information element (IE), for example an MFP IE, which provides at least a sequence number, a timestamp and a message integrity check (MIC).

FIG. 2 is an example illustration of an information element (IE) for a management frame protection information element (MFP IE) 200 in accordance with an exemplary embodiment. The MFP IE 200 comprises a management frame protection identification (MFP ID) 202 that is 1 byte in length. The MFP ID indicates that the IE is an MFP IE. A length field 204 of 1 byte in length is used to store the length of the MFP IE 200. A timestamp is stored in the timestamp field 206, which is 4 bytes in length. The timestamp in the timestamp field 206 can be employed for detecting a rogue AP. If a rogue AP rebroadcasts a management frame, or broadcasts a management frame with a copied IE, the timestamp in timestamp field 206 would indicate the frame is an old frame, facilitating the detection of a spoofed or otherwise invalid management frame. A replay counter 208 that is 8 bytes in length is used to store a sequential number to also help detect spoofed or otherwise invalid management frames by comparing the sequential number stored in replay counter 208 with the sequential number obtained from previously received packets. If the MFP IE on a management frame is determined to have, the same or lower, sequential number as an earlier MFP IE, then a spoofed or otherwise invalid frame would be indicated. A message integrity check (MIC) is stored in the 8 byte MIC field 210. The inability to validate the data stored in the MIC field 210 using the key for the purported source of the management frame would be indicative of a spoofed or otherwise modified frame.

For example, referring back to FIG. 1 with continued reference to FIG. 2, when AP1 104 sends a management frame, for example a probe response, AP2 106 receives the management frame and using a key that was either obtained from AP1 104 via network 108 or directly from security server 102 and validates the management frame using the key. For example, the key decodes the MFP IE 200 to validate the data in the MIC field 210. In embodiments employing a timestamp and/or sequence counter, AP 106 verifies that the timestamp stored in the timestamp field 206 is not stale, and/or that the sequence number stored in replay counter 208 is not the same as, or lower than, a sequence number received in a previous packet. If AP 106 detects an invalid MIC 210, timestamp 206, and/or replay counter 208, AP 106 generates an alarm. The alarm is suitably in the form of a visual, audio, and/or an automatic notification, such as an email to a system administrator or notification to an intrusion detection/prevention system.

Referring again to FIG. 1, rogue AP 110, in this example, rogue AP 110 is an intruder attempting to pretend to be AP1 104. Rogue AP 110 pretending to be AP1 104 sends a management frame, such as a deauthenticate or disassociate message to client 112. If rogue AP 110 sends a deauthenticate or disassociate message to client 112, this has the potential effect of causing client 112 to roam to rogue AP 110. AP2 106, which is in range of rogue AP 110 and capable of receiving signals sent by rogue AP 110, also receives the management frame sent by rogue AP 110. AP2 106 would then attempt to verify the management frame using the key supplied either by AP1 104 or WDS 102 over backbone 108. If the message sent by rogue AP 110 does not have a signature, then AP2 106 determines that the management frame is invalid (e.g., was sent by an intruder). If the message does have a signature, e.g., an MFP IE, then AP2 106 attempts to verify the MIC associated with the message using the key for AP1 104. If the MIC cannot be validated with the key for AP1 104, then AP2 106 determines that the message is invalid (e.g., spoofed or sent by a rogue AP). In addition, if the management frame contains a sequence number or timestamp, these may also be verified by AP2 106.

As AP2 106 detects invalid management frames, AP2 106 generates an alarm. The alarm can include at least one of an email to a system administrator (not shown), an auto-dialed message to a system administrator, an alert sent to WDS 102, and/or an audible or visual alarm.

In accordance with an aspect of the claimed embodiments, WDS 102 implements a method for distributing signature keys between access points of network 100. It should be noted that a key established as part of the AP to WDS authentication sequence can then be used to secure the key distribution sequence. AP1 104 authenticates with WDS 102. AP2 106 also authenticates with WDS 102. AP2 may authenticate either before, during, or after the authentication of AP1 104. WDS 102 assigns a first signature key to AP1 104. Optionally, WDS 102 assigns a second signature key to AP2 106. WDS 102 in response to a request from AP2 106 for the signature key for AP1 sends the first signature key to AP2 106 enabling AP2 106 to validate messages purported to be originating from AP1 104. Other embodiments of the present claimed embodiments further contemplate that WDS 102 stores a list of access points requesting the signature key for AP1 104. When WDS 102 updates AP1's 104 signature key, it automatically notifies AP2 106 and, optionally, propagates the updated signature key to any other AP that previously requested AP1's 104 signature key of the update. In embodiments that have AP1 104 distributing the signature key, AP1 104 automatically propagates the updated signature key to access points previously requesting the signature key.

Figure 6:
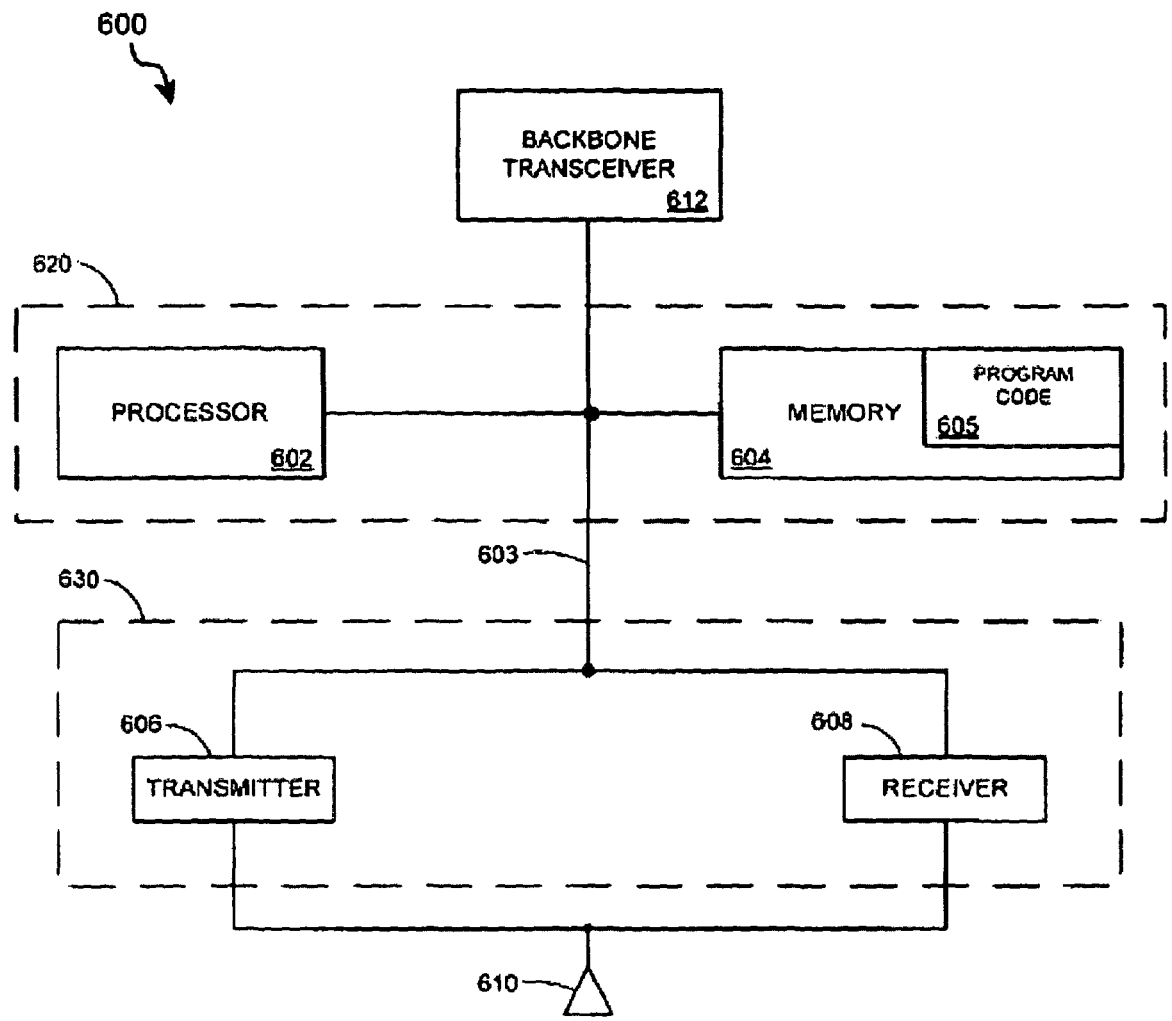
FIG. 6 is a block diagram of an access point that is configurable to implement a methodology in accordance with an exemplary embodiment.

Referring to FIG. 6, there is illustrated an access point 600 that is adaptable to be configured in accordance with the principles of the claimed embodiments. The access point 600 comprises a controller 620 and a transceiver 630. Controller 620 comprises a central processing unit (processor) 602, such as a microprocessor, and controls the operation of transceiver 630. Controller 602 is coupled to memory 604 via bus 803. Bus 803 is suitably any type of wired, wireless, or combination of wired and wireless structures capable of transporting data. Memory 604 is any suitable memory for data storage including hard disk, floppy disk, random access memory, or optical storage. A portion of memory 604 contains program code 605 that is used by controller 602. Program code 605 is suitably adapted with computer readable instructions for use by controller 602 to implement the various methodologies described herein. In addition, bus 603 is connected to transmitter 606 and receiver 608 within transceiver 630.

Transceiver 630 comprises transmitter 606, a wireless transmitter. Controller 620 sends data from memory 604, or any other source, to transmitter for wireless transmission via antenna 610.

Transceiver 630 also comprises receiver 608 is a wireless receiver. Data received via antenna 610 is directed to receiver 608, which performs any decoding, and stores the received data in memory 604 or any other suitable location. Although transmitter 606 and receiver 608 are shown as both being connected to antenna 610, in alternative embodiments transmitter 606 and receiver 608 have their own antenna (not shown).

Backbone transceiver 612 is used to communicate with the network (e.g., backbone 108 in FIG. 1). Backbone transceiver 612 is suitably adapted to perform at least one of receive and transmit data, and is used to connect access point 600 to the backbone (not shown) of the network. This enables access point 600 to communicate with other components on the network. For example, when a management frame is received via antenna 610 through receiver 608, processor 602 can send use backbone transceiver 612 to obtain the key to validate the management frame.

Figure 3:
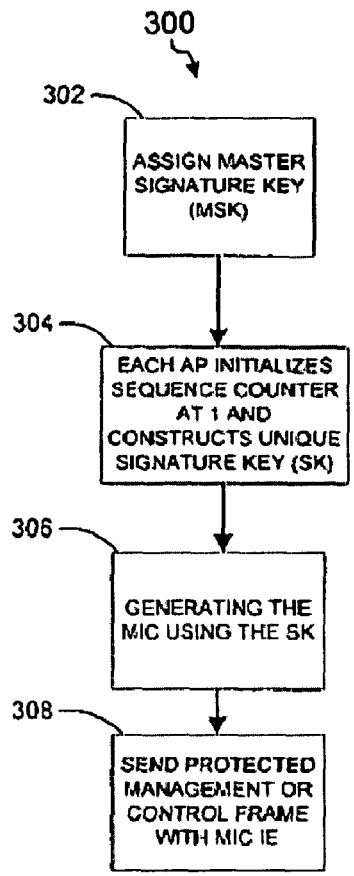
FIG. 3 is a methodology for protecting management frames in accordance with an exemplary embodiment.
Figure 4:
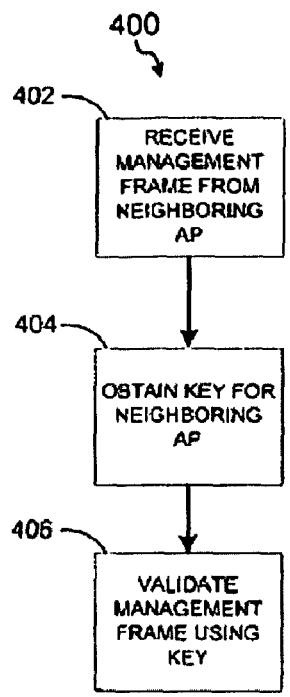
FIG. 4 is a methodology for validating a management frame in accordance with an exemplary embodiment.
Figure 5:
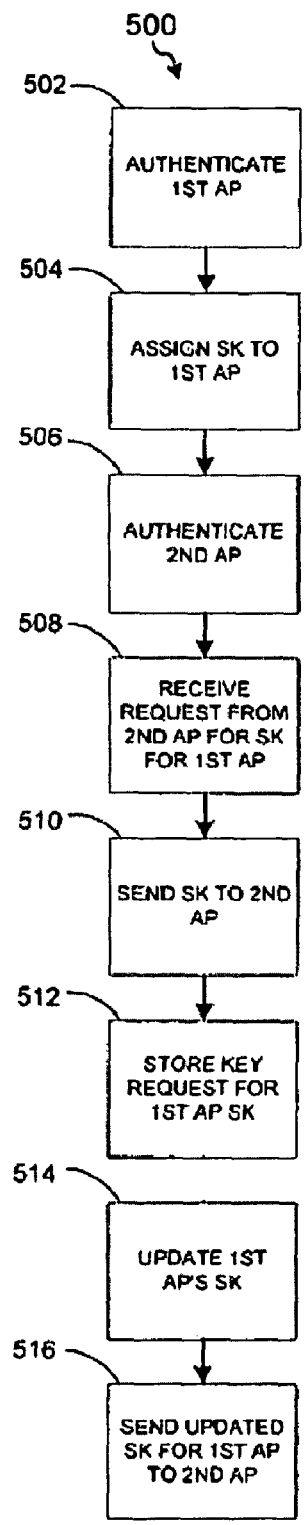
FIG. 5 is a methodology for distributing a signature key in accordance with an exemplary embodiment.

In view of the foregoing structural and functional features described above, a methodology in accordance with various aspects of the claimed embodiments will be better appreciated with reference to FIGS. 3-5. While, for purposes of simplicity of explanation, the methodologies of FIGS. 3-5 are shown and described as executing serially, it is to be understood and appreciated that the claimed embodiments are not limited by the illustrated order, as some aspects could, in accordance with the claimed embodiments, occur in different orders and/or concurrently with other aspects from that shown and described herein. Moreover, not all illustrated features may be required to implement a methodology in accordance with an aspect the claimed embodiments.

FIG. 3 is a methodology 300 for protecting management frames in accordance with an aspect of the claimed embodiments. At 302 a master signature key (MSK) is assigned to an AP at the time of AP registration. The key can be updated using a secure protocol, such as WLCCP, available from Cisco Systems, Inc., 170 West Tasman Drive, San Jose, Calif., whenever the MSK expires. The expiration period of the MSK is a configurable option. Each AP initializes a sequence counter as 1 and constructs a unique signature key (SK), for example using the method defined by 802.11 Task Group i (TGi):

SK=PRF-128(MSK, "MFP key protocol"||key protocol||BSSID), where key protocol identifies the type of key protocol being used and can be any suitable protocol such as SWAN, Smart Wireless Architecture for Networking, an architecture for radio, network and mobility management within a secure environment, is a proprietary key methodology available from Cisco Systems, Inc. The key is then distributed to neighboring access points. The key can be distributed by a central entity that distributes keys such as a WDS or security server, or APs themselves can distribute the keys to neighboring APs using a secure protocol such as WLCCP (described herein supra).

At 306, the AP generates the MIC using the SK. At 308, the AP sends a protected management or control frame with the MIC IE. The MIC IE can be used by itself or be part of an MFP IE for protecting the frame. For example, the AP sends management frames such as beacons, probe/authentication/association requests and responses using a MIC IE or a MFP IE that protects the frames. The MIC IE or an MFP IE can include at least one of a sequence counter, and a timestamp. The sequence counter and/or timestamp increases in order to protect against replay attacks. At this point all neighbor APs, WDSs, or any other security server or distributor of keys can generate keys and start detecting forgeries. APs can advertise this capability either as part of an IE or using proprietary messaging schemes. The claimed embodiments are suitably adaptable to protect multicast and unicast frames originating from an access point, and to detect a rogue access point.

FIG. 4 is a methodology 400 for validating a management frame in accordance with an aspect of the claimed embodiments. As used herein management frames, such as for an 802.11 network, include but are not limited to beacons, probe requests, probe responses, association requests, association responses, disassociation messages, authentication requests, authentication responses, deauthentication requests, reassociation requests, reassociation responses, 802.11 Task Group E (TGe) action frames, 802.11 Task Group h (TGh) action frames, and 802.11 Task Group k (TGk) action frames. The management frame contains one or more of an information element (IE), a robust security network information element (RSN IE), and a message integrity check (MIC). At 402 a management frame is received. The management frame can be from any component, such as a neighboring access point, within range.

At 404, a key for the source of the management frame, e.g., a neighboring access point, is obtained. The key is obtained either from a security server, WDS or other key management component on the network, or obtained directly from a neighboring access point via secure communication across a network backbone.

At 406, the management frame is validated using the key obtained in 604. The key is used to decode and validate a signature associated with the management frame, such as a MFP IE or MIC. A management frame that does not have a signature is determined to be invalid. A management that has a signature correctly encoded is deemed valid, otherwise the management frame is deemed invalid. When an invalid management frame is received, preferably an alarm is generated. Additionally, an invalid management frame counter could optionally be incremented every time an invalid frame is received. Once a pre-defined threshold is reached, appropriate security polices can be applied to address the situation. Other aspects of the claimed embodiment include location determination means for detecting the location of the source of the invalid frame, which is transmitted with the alarm. If the MFP IE or MIC contain a timestamp or sequence number, these are also validated. By using methodology 400, the claimed embodiments can detect spoofed frames or frames sent by potential intruders to the network.

FIG. 5 is a methodology for distributing a signature key in accordance with an aspect of the claimed embodiments. At 502, a first access point (AP) is authenticated on the network. A security server, authentication server, WDS or any component on the network suitably adapted to authenticate network components on the backbone performs the authentication. At 504, the first AP is assigned a signature key (SK).

At 506, a second AP is authenticated on the network. As with the first AP, a security server, authentication server, WDS or any component on the network suitably adapted to authenticate network components on the backbone performs the authentication.

At 508, a request is received from the second AP for the signature key (SK) of the first AP. The request is sent from the second AP to one of a security server, authentication WDS or any component on the network suitably adapted to perform key management and/or distribution. For example, the second AP sends a message to its WDS for the key, which the WDS either sends back, or in the case of a hierarchical network and the second AP belonging to another segment, the WDS obtains the key. Alternatively, the first AP sends a message across the network backbone to the second AP. Preferably, the messages sent are protected (e.g., encrypted) across a secure backbone. At 510, the signature key is sent to the second AP.

At 512, the SK for the 1st AP's signature key is stored by the second AP. The stored key information would contain an address or identifier of the entity requesting the SK (e.g., in this example the 2nd AP). At 514, the SK of the 1st AP is updated. Updates are initiated when a SK expires, initiated by a network component, such as a WDS, or by a network administrator. At 516, the updated SK for the 1st AP is sent to the 2nd AP. Furthermore, any other network component that requested the SK for the 1st AP (e.g., that is stored as in step 512) also receives the updated SK. Aspects of the claimed embodiments can include sending the key using a secure protocol, such as WLCCP described hereinbefore. The key is sent either by a WDS or other network component responsible for key management and/or distribution or the 1st AP.

In addition to the methodologies described in FIGS. 3-5, the claimed embodiments further contemplate a computer readable medium with computer readable instructions thereon for performing the methodologies of FIGS. 3-5. A computer-readable medium is any article of manufacture that contains data that can be read by a computer or a carrier wave signal carrying data that can be read by a computer. For example, the means for defining a plurality of groups of client configurations and means for allocating portions of a network infrastructure to service the groups may be distributed on magnetic media such as a floppy disk, flexible disk, hard disk, reel-to-reel tape, cartridge tape and cassette tape; optical media, such as a CD-ROM, DVD and writeable compact disk; or on a carrier wave signal received through a network, wireless network, or modem including radio-frequency signals and infrared signals or over a wired network (such as an Ethernet).

As discussed in more detail below, it can be advantageous to use two sets of keys—one for the infrastructure and one for mobile stations—for protecting management frames. By doing so, it can be assured that an attacker that successfully attacks the weaker station-side of a network can not then successfully defeat management protection frames on the infrastructure side. Furthermore, autonomous mechanisms can also be enabled to defeat the attacker and repair the compromised network. Restated, since the attacker does not have the keys that infrastructure access points use to authenticate each other, the attacker may, upon detection, be prevented from spoofing an infrastructure access point, even though they gained access to one or more mobile stations.

It will also be seen that there are several advantages to the claimed embodiments. For example, the idea of merely detecting spoofed management protection frames has now evolved to one of preventing protected management frames from being compromised in the first place. Additionally, the claimed embodiments provide an ability to react to attackers. Previous attempts to do so have not been satisfactory due to unintended effects on neighboring WLAN's that may have unwittingly tried to connect to the WLAN that thinks it is under attack. The claimed embodiments provide the means to detect specific malicious rogues, and a method by which they can be removed from the enterprise WLAN, ensuring the neighboring WLANS will be unaffected.

In conjunction with the claimed embodiments, an exemplary wireless network will now be described.

Exemplary Wireless Network System Architecture

Network Topology

Figure 7:
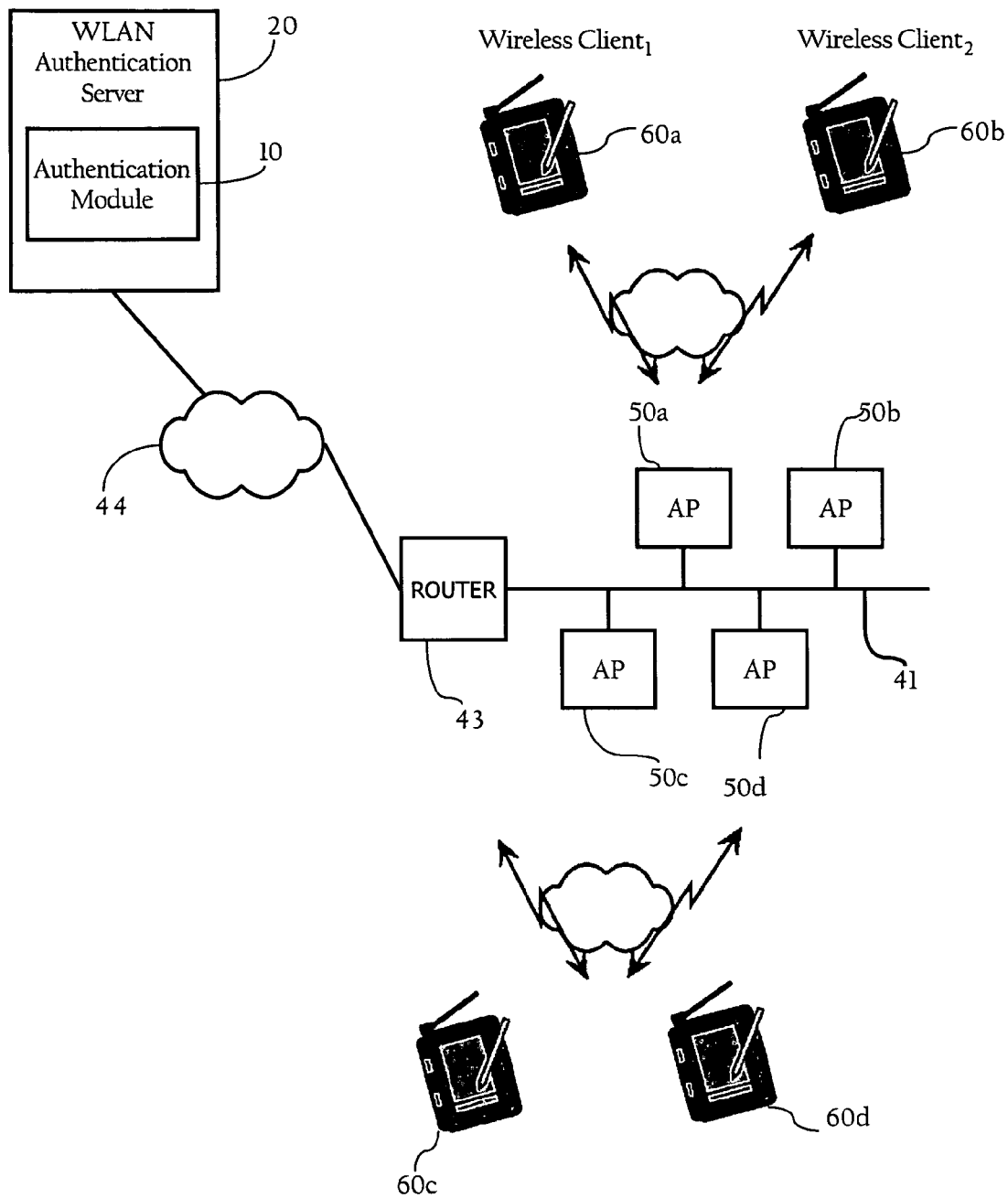
FIG. 7 is a topological diagram of components in a wireless local area network system, in accordance with an exemplary embodiment.

A network environment according to one implementation of the claimed embodiments is shown in FIG. 7. In a specific embodiment, the system includes an authentication module 10 running on a network authentication server 20, a router 43, a local area network (LAN) 41, and wireless access points 50a, 50b, 50c, and 50d (collectively referred to as wireless access points 50). LAN 41 is implemented by a switch (or an array of switches) and/or other network devices, such as a bridge.

As described in more detail below, in one implementation, network authentication server 20 comprises authentication module 10 which may be a RADIUS server, but may be any other type of authentication server. As FIG. 1 illustrates, these network elements are operably connected to a network 44. Network 44, in one implementation, generally refers to a computer network, such as a LAN, a WAN, etc., that includes one or more intermediate network devices (e.g., routers, switches, etc.), which allow for the transmission of messages between network authentication server 20 and wireless access points 50. Of course, network 44 can include a variety of network segments, transmission technologies, and components, such as terrestrial WAN links, satellite links, and cellular links. Network 41 may be a LAN or LAN segments implemented by an Ethernet switch (not shown) or an array of switches having multiple ports to which wireless access points 50 are connected. The wireless access points 50 are typically connected to the switch ports via Ethernet links; however, other link layer connection protocols or communication means can be employed. FIG. 7 illustrates one possible network environment in which the claimed embodiments may operate; however, other implementations are possible. For example, although network authentication server 20 is illustrated as being on a different LAN or LAN segment, it may be co-located with wireless access points 50.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification. The wireless access points 50 may be autonomous or so-called "fat" wireless access points, or light-weight wireless access points operating in connection with a wireless switch (not illustrated), as disclosed in U.S. patent application Ser. No. 10/407,584, now U.S. Pat. No. 7,212,837. In addition, the network infrastructure may also include a Wireless LAN Solution Engine (WLSE) offered by Cisco Systems, Inc. of San Jose, Calif. or other wireless network management system. Furthermore, U.S. patent application Ser. No. 11/195,536 discloses methods and systems for automatically assigning an identity to, and configuring, the wireless access points 50. Of course, configuration and management information can be obtained in a variety of manners without departing from the scope of the claimed embodiments.

In one implementation, the wireless clients and the wireless network infrastructure, including the wireless access points 50 and authentication module 10, implement a security mechanism to encrypt and secure wireless communications. In one implementation, the wireless clients and the wireless network infrastructure employ a network access protocol, such as the IEEE 802.1X standard, which employs on the Extensible Authentication Protocol (EAP). This protocol provides an authentication framework that supports methods for authenticating and authorizing network access for the wireless clients. Still further, in one implementation, the wireless clients and the wireless network infrastructure implement the security and encryption mechanisms specified in the IEEE 802.11i specification. As discussed below, the encryption mechanisms, in one implementation, involve the generation and use of Pairwise Master Keys and Pairwise Transient Keys. In one implementation, a pairwise master key is a code or string derived from a master secret, and is used to derive a Pairwise Transient Key (PTK). Accordingly, a Pairwise Transient Key is a value string derived from a pairwise master key (PMK). According to the IEEE 802.11i specification, the PTK is split into multiple encryption keys and message integrity code (MIC) keys for use by a wireless client and the wireless network infrastructure as temporal session keys. Other encryption and security mechanisms can also be used, such as the PPP protocol. As discussed above, an embodiment of the system can extend the 802.11i functions to create keys for the protection of management frames; however, in other embodiments, the PTKs used to protect and authenticate the data frames can also be used for the management frames transmitted by the wireless clients and the access points.

In addition to authenticating, and providing signature keys (SKs or IMFP keys) to, access points as discussed above, authentication module 10, in one implementation, is operative to authenticate wireless users to allow access to network resources available through wireless access points 50. In one implementation, authentication module 10 implements Remote Authentication Dial In User Service (RADIUS) functionality, as disclosed in RFCs 2138, 2865, and 2866. As described more fully below, when a wireless client attempts to connect to the wireless network, the access point 50 proxies the authentication session between the wireless client and authentication module 10.

Mobile Station

Figure 8:
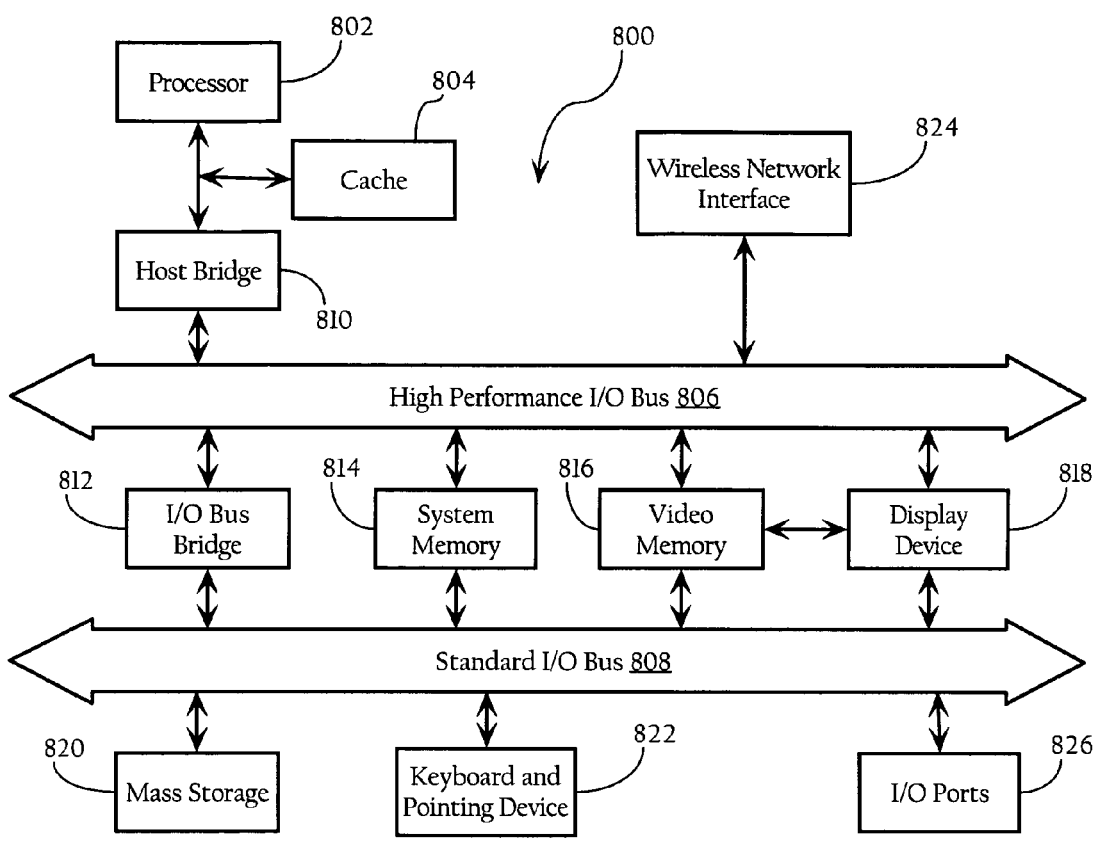
FIG. 8 illustrates, for didactic purposes a hardware system which can be used to implement a wireless client 60 of FIG. 7, in accordance with an exemplary embodiment.

FIG. 8 illustrates for didactic purposes a hardware system 800, which can be used to implement a wireless client 60 of FIG. 7, in accordance with an exemplary embodiment. In one embodiment, hardware system 800 includes processor 802 and cache memory 804 coupled to each other as shown. Additionally, hardware system 800 includes high performance input/output (I/O) bus 806 and standard I/O bus 808. Host bridge 810 couples processor 802 to high performance I/O bus 806, whereas I/O bus bridge 812 couples the two buses 806 and 808 to each other. Coupled to bus 806 are wireless network/communication interface 824, system memory 814, and video memory 816. In turn, display device 818 is coupled to video memory 816. Coupled to bus 808 are mass storage 820, keyboard and pointing device 822, and I/O ports 826. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 800 are described below. In particular, wireless network interface 824 is used to provide communication between system 800 and any of a wide range of wireless networks, such as a WLAN (e.g., IEEE 802.11), etc. Mass storage 820 is used to provide permanent storage for the data and programming instructions to perform the above described functions implemented in the system controller, whereas system memory 814 (e.g., DRAM) is used to provide temporary storage for the data and programming instructions when executed by processor 802. I/O ports 826 are one or more serial and/or parallel communication ports used to provide communication between additional peripheral devices, which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module", with processor 802 being referred to as the "processor core". Furthermore, certain implementations of the claimed embodiments may not require nor include all of the above components. For example, the peripheral devices shown coupled to standard I/O bus 808 may be coupled to high performance I/O bus 806. In addition, in some implementations only a single bus may exist with the components of hardware system 800 being coupled to the single bus. Furthermore, additional components may be included in system 800, such as additional processors, storage devices, or memories.

In one embodiment, the operations of wireless client-side management frame authentication functionality are implemented as a series of software routines run by hardware system 800. These software routines, which can be embodied in a wireless network interface driver, comprise a plurality or series of instructions to be executed by a processor in a hardware system, such as processor 802. Initially, the series of instructions are stored on a storage device, such as mass storage 820. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 824. The instructions are copied from the storage device, such as mass storage 820, into memory 814 and then accessed and executed by processor 802. In alternate embodiments, the claimed embodiments can be implemented in discrete hardware or firmware.

While FIG. 8 illustrates, for didactic purposes, the hardware architecture of a wireless client according to one implementation of the claimed embodiments, the claimed embodiments, however, can be implemented on a wide variety of computer system architectures, such as dual-mode cellular phones, wireless VoIP phones, Personal Digital Assistants, Laptop computers, and the like. An operating system manages and controls the operation of system 800, including the input and output of data to and from software applications (not shown). The operating system provides an interface, such as a graphical user interface (GUI), between the user and the software applications being executed on the system. According to one embodiment of the claimed embodiments, the operating system is the Windows® 95/98/NT/XP operating system, available from Microsoft Corporation of Redmond, Wash. However, the claimed embodiments may be used with other operating systems, such as the Apple Macintosh Operating System, available from Apple Computer Inc. of Cupertino, Calif., UNIX operating systems, LINUX operating systems, and the like.

Access Point

Figure 9:
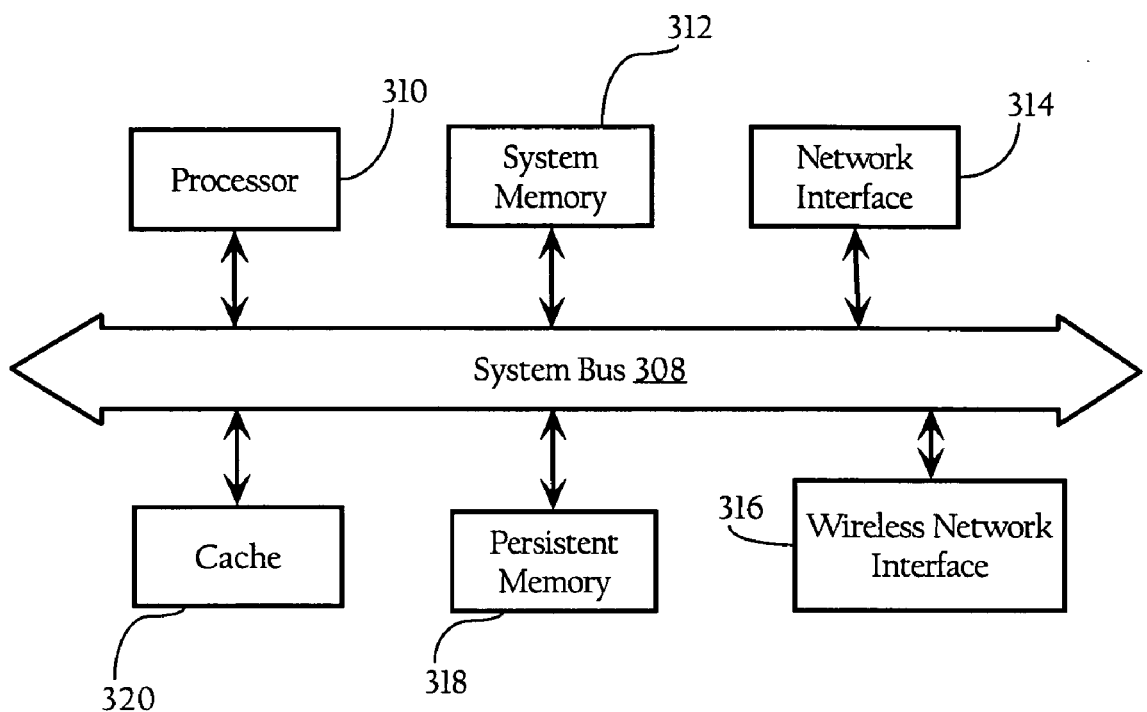
FIG. 9 is a functional block diagram illustrating the components of an access point, in accordance with an exemplary embodiment.

FIG. 9 illustrates for didactic purposes a wireless access point, which can be used to implement a wireless access point of FIG. 7. In one implementation, the wireless access point comprises a processor 310, a memory 312, a network interface 314 (e.g., an 802.3 interface) for communication with a LAN, a wireless network interface 316 (e.g., an IEEE 802.11 WLAN interface) for wireless communication with one or more wireless clients 60, a persistent memory 318, a cache 320 for storing VLAN information, and a system bus 308 interconnecting these components. The wireless access points 50 may also include software modules (including DHCP clients, Cisco® Discovery Protocol (CDP) modules, wireless access point modules, SNMP functionality, etc.) and device drivers (e.g., network and WLAN interface drivers) stored in the persistent memory 318 (e.g., a hard disk drive, flash memory, etc.). At start up, these software components are loaded into memory 312 and then accessed and executed by processor 310. In some implementations, at least some of the wireless access points can operate in a sensor or detector mode to monitor for infrastructure-side management frames, and to validate the frames as discussed in more detail below. In some implementations, specialized detectors have a similar hardware architecture illustrated in FIG. 9 can be used.

Authentication of Infrastructure Management Frames with Link and IMFP Keys

Figure 10:
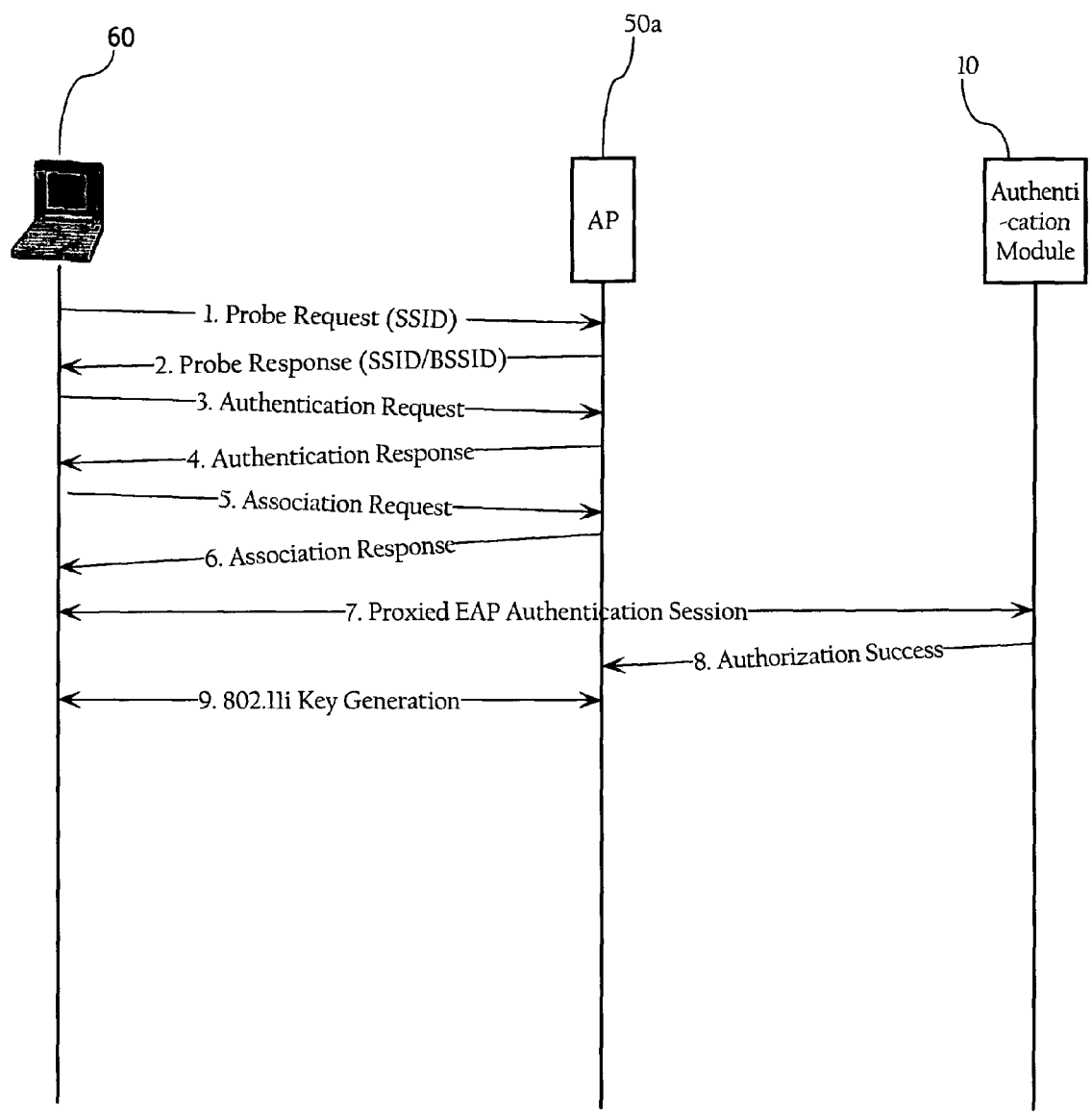
FIG. 10 is a diagram illustrating information flow among a wireless client, an access point, and a wireless local area network authentication server in accordance with an exemplary embodiment.

FIG. 10 is a diagram illustrating a possible message flow among a wireless client, an access point 50a, and authentication module 10 in accordance with one implementation of the claimed embodiments. Initially, a wireless client 60 may send a probe request to an access point 50a, which responds with a probe response frame (see FIG. 10, Nos. 1 & 2). In a similar manner, authentication and association messages are also exchanged (see FIG. 10, Nos. 3-6). Once those three message handshakes are successfully completed, a proxied EAP authentication session is initiated between authentication module 10 and the wireless client 60 (FIG. 10, No. 7). A successful EAP authentication session results in the generation of a Pairwise Master Key (PMK) that is distributed to the access point 50a and the wireless client 60. In one implementation, the success message may include the Pairwise Master Key (PMK), which is provided to wireless client (see FIG. 6, No. 8). As FIG. 10 illustrates, the wireless client and the access point then generate session keys (e.g., Pairwise Transient Keys (PTKs) according to the IEEE 802.11i standard) (see FIG. 6, No. 9)

As discussed herein, encryption and authentication of packets transmitted between wireless client 60 and the access point 50a may involve a number of different key types. For example, wireless client 60 and access point may use a set of link or session keys to encrypt and authenticate unicast packets transmitted between the wireless client and the access point 50a. In addition, the access point 50a may use a set of group or broadcast keys for encryption and authentication of broadcast frames. In addition, as discussed above, a separate set of link and/or broadcast keys may be used to encrypt and/or authenticate wireless management frames; however, in other embodiments, the same sets of keys are used for data, control and management frames transmitted between the access point 50a and the wireless client. Still further, as discussed above, the access point 50a may also use a IMFP key and include an IMFP MIC in transmitted wireless management frames to allow other access points or detectors to authenticate the frames.

In accordance with the present system and method, client-specific unique keys and corresponding MICs are generated to secure transmission of wireless management frames between the wireless clients and the access points. It will be appreciated that the management frame key may be derived in the same manner as the session keys referred to as the Pairwise Transient Keys (PTK) are derived as defined by the 802.11i pre-standard. Further, it will be appreciated that the key used to protect the management frames may be derived as an extension to the PTK derivations. Still further, the keys used to protect data packets may also be used to generate the management frame MIC.

As discussed above, wireless management frames transmitted by the access points may include an IMFP MIC as discussed above. However, depending on type, a given wireless management frame transmitted by a wireless access point 50 may include two MICs—a link MIC (generated using the link unicast or broadcast key) and an IMFP MIC (generated using the IMFP key). Generally, wireless management frames transmitted by wireless access points 50 not involving connection set up with, and/or prior to authentication of, a wireless client (such as beacon frames, probe response frames, authentication response frames and other class 1 and 2 management frame subtypes as defined in the IEEE 802.11 standard) include only the IMFP key. Infrastructure wireless management frames transmitted by the wireless access point 50 after authentication (such as QoS frames and other class 3 management frame subtypes) include both a link MIC (generated using either a unicast or broadcast session key) and the IMPF MIC. Wireless clients may use the link MIC to validate the authenticity and integrity of wireless management frames transmitted by the wireless access points 50. In one embodiment, since the IMFP keys are not distributed to the wireless clients, however, the wireless clients simply ignore the IMFP MIC.

Figure 11:
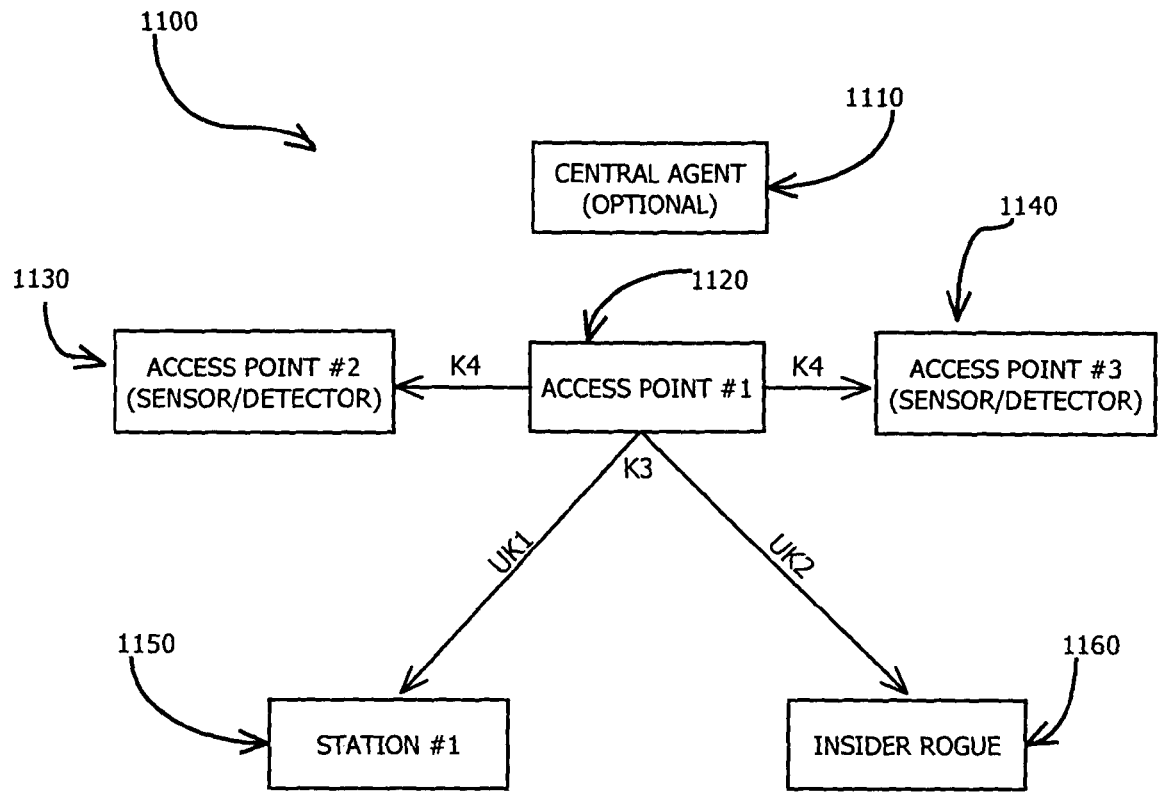
FIG. 11 is a block diagram illustrating a mechanism for protecting infrastructure access points from an insider rogue, in accordance with an exemplary embodiment.

FIG. 11 illustrates an insider attack that embodiments can address. While the use of IMFP keys prevents rogue systems that cannot authenticate as network infrastructure elements from disrupting wireless client sessions by spoofing legitimate infrastructure access points, their use may not prevent attacks by insider rogues who can successfully authenticate to the network infrastructure as clients. Assume for didactic purposes that insider rogue system 1160 (operated by a disgruntled employee for example) access the wireless network system and successfully authenticates with a network authentication server, for example the authentication server 20 of FIG. 7. Given the foregoing, the insider rogue system would be configured with a unicast session key (UK2) and the broadcast session key (K3) used to authenticate broadcast type wireless management frames. Accordingly, the insider rogue system 1160 may then attempt to spoof an infrastructure access point and use the broadcast session key (K3) to compute MICs that the wireless clients use to authenticate the frames. Unfortunately, this insider rogue system may then attempt to disrupt wireless connections between infrastructure access point 1120 by transmitting broadcast disassociation or deauthentication frames. While this may operate to disrupt the wireless client sessions, one or more wireless nodes (such as access point 1120, or detectors 1130, 1140) within radio coverage of the insider rogue system 1160 will also detect the wireless management frames and attempt to validate them using the IMPF key. Since the insider rogue system 1160 does not have knowledge of the IMPF key, the validation(s) will fail, triggering one or more actions (such as an alert notifying a network administrator who may then take corrective action). It is also worth noting three possible methods, amongst others, for a rogue to obtain the broadcast session key. One example is a disgruntled employee insider that poses as a 'legitimate client'. In another method, an attacker could perhaps obtain the broadcast session key by infecting a legitimate client with a virus. In general, clients are not as secure as infrastructure access points and are therefore more susceptible to an attacks, such as the virus example. Another method of obtaining the broadcast key is to perhaps attack the broadcast key itself.

Several preferred embodiments will now be presented illustrating methods directed to enhanced security mechanisms operative to prevent or mitigate various attacks, such as rogue systems spoofing infrastructure access points. As discussed herein, the security mechanism employs two sets of keys—link keys and IMPF keys—to guard against various types of attacks.

FIG. 11 is a block diagram 1100 illustrating a mechanism for protecting infrastructure access points from an insider rogue, in accordance with an exemplary embodiment. Included in mechanism 1100 is an optional central agent 1110, access points 1120, 1130 and 1140, wireless station 1150 and insider rogue 1160. Rogue 1160 is referred to as an insider because it typically will initially have authorized access but, for various reasons, may wish to disrupt wireless connections between wireless clients and infrastructure access points and/or have wireless clients associate with the rogue system 1160. Central agent 1110, in one implementation, is operative to apply one or more security policies based on an alert generated by one or more detectors 1130, 1140.

In practice, access points 1120, 1130 and 1140, as discussed above, obtain respective infrastructure management frame protection (IMFP) keys during authentication with a network authentication server 20. As FIG. 11 illustrates, access points 1130, 1140 obtain the IMFP key K4 of wireless access point 1120 either directly or indirectly from network authentication server 20 or central agent 1110. In one embodiment, access points 1130, 1140 may optionally obtain one or more broadcast session keys (K3) used by access point 1120 to protect broadcast wireless management frames. As discussed above, IMFP key K4 is not distributed to wireless clients. Of course only three access points are depicted in FIG. 11 and this is merely exemplary as the infrastructure can obviously be much larger.

As discussed above, wireless client or station 1150, in this example, communicates with access point 1120 utilizing broadcast group key K3 and link key UK1, which is unique between station 1150 and wireless access point 1120. Knowledge of group key K3 and link key UK1 can sometimes be discovered by insider rogue 1160 especially if security protocols are employed that are not robust, for example using Pre-Shared Keys generated from weak pass-phrases. In addition, insider rogue 1160 may discover the broadcast key (K3) upon successful authentication with network authentication server 20 via wireless access point 1120. Once K3 and/or UK1 are discovered, the insider rogue 1160 can try to poll station 1150, spoofing wireless access point 1120, in broadcast and unicast modes in an effort to disrupt the wireless connection. However, since insider rogue 1160 does not know IMFP key K4, insider rogue 1160 will be detected by one or more of infrastructure access points 1120, 1130 and 1140.

Figure 12:
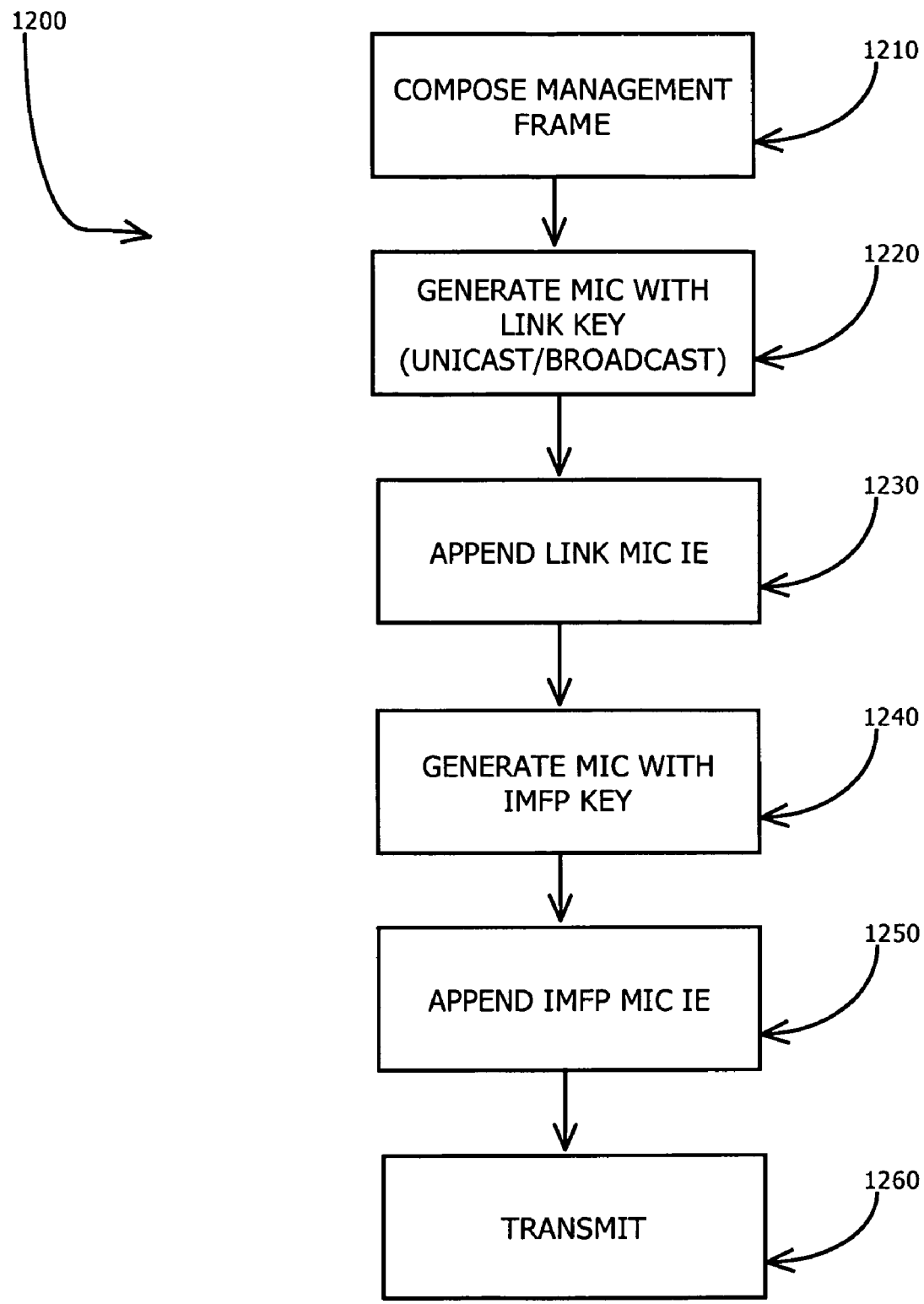
FIG. 12 is a flowchart illustrating a method for an access point to generate infrastructure management frame protections (IMFP) that are sent to wireless clients, in accordance with an exemplary embodiment.

FIG. 12 is a flowchart illustrating a method 1200 implemented by an access point to generate link and infrastructure management frame protection (IMFP) MICs appended to wireless management frames that are sent to wireless clients, in accordance with an exemplary embodiment. Initially, a wireless management frame (is composed at step 1210 at an access point such as access point 1120. Then, a first message integrity check (MIC) information element (IE) with at least one link key is generated and appended to the wireless management frame at steps 1220 and 1230. The link key used to generate the link MIC may either be a unicast session key (K1) unique to the intended recipient (e.g., wireless client 1150), or a broadcast session key (K3) for broadcast wireless management frames. Next, a second MIC IE with an IMFP key is generated and appended to the wireless management frame at steps 1240 and 1250. Finally, the wireless management frame is transmitted to one or more wireless stations, such as wireless station 1150 of FIG. 11.

As previously indicated, the claimed embodiments are capable of detecting a potential attack launched by a wireless rogue system (such as rogue system 1160). This embodiment is further detailed in reference to FIG. 13 which is a flowchart illustrating a method 1300 for verifying one or more MICs appended to wireless management frames that appear to be sourced from an infrastructure access point, in accordance with an exemplary embodiment. As discussed herein, the detection and validation method illustrated in FIG. 13 may be implemented by access-points 1130, 1140 (or other detection node) operating in a dedicated security or rogue detection mode. First, a frame is received and is checked to see where it is a wireless management frame that appears to be sourced from an infrastructure access point (see 1302, 1304). If not, then the frame is examined by another process (or simply discarded without further analysis) via step 1306. In one embodiment, the detecting nodes (such as access points 1130, 1140 of FIG. 11) are configured with a list or other data structure containing the MAC addresses of one or more wireless access points (such as wireless access point 1120 of FIG. 11). In one implementation, this list can be extended into a table that also maintains the IMFP key(s), and optionally the group broadcast keys, corresponding to the infrastructure access points. Accordingly, the check 1304 can be performed by comparing the source MAC address in a received frame to the MAC address(es) in the list of infrastructure access points.

If the wireless management frame appears to be sourced from an infrastructure access point, the detection process selects the number of MICs that ought to be present, at decision point 1307. A wireless management frame transmitted by an infrastructure access point, as discussed above, can have either one or two MIC's depending on the subtype of the wireless management frame. For example, class 1 and 2 of management frames defined in the IEEE 802.11 standard typically will have one MIC, while wireless management frames of the class 3 subtype typically have two MICS.

Figure 13:
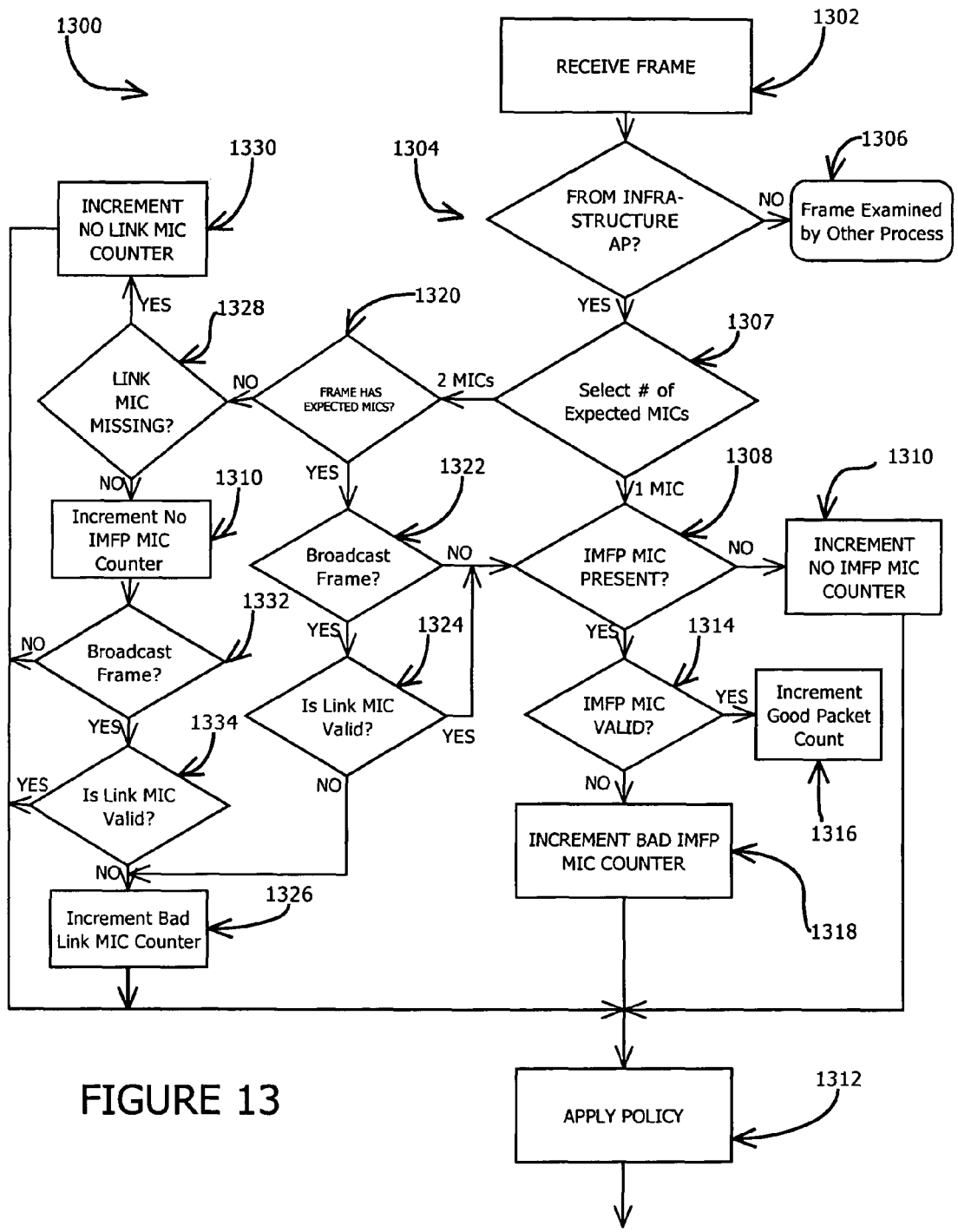
FIG. 13 is a flowchart illustrating a method for verifying a message integrity check embedded in an IMFP frame purported to be from an infrastructure access point, in accordance with an exemplary embodiment.

As FIG. 13 illustrates, a detector maintains a plurality of counters corresponding to various events (such as a missing MIC) generated during receipt and inspection of wireless management frames. Generally, if only one MIC is to be expected in the received wireless management frame, the detection process validates the frame by determining the presence and validity of an IMFP MIC (in one embodiment, appended in an information element to the frame). If an IMFP MIC is not present, the detection process increments a "no IMFP MIC" counter (1310). As FIG. 14 illustrates, one or more security policies can be applied in response to the detected MIC failure (1312). If the IMFP MIC is present, the detection process validates the IMFP MIC using the IMFP key corresponding to the infrastructure access point identified in the source MAC address filed of the frame. If the IMFP MIC is present and valid, the detection process increments a good packet counter (1316). Otherwise, a bad IMFP MIC counter is incremented (1318) and a security policy is applied (1312).

If the detection process determines that two MICs ought to be present in the frame, the detection process then determines whether the frame includes the expected link and IMPF MICs (1320). If so, the detection process may optionally validate the link MIC using the broadcast group key (K3) corresponding to the infrastructure access point (1324), if the received wireless management frame is a broadcast frame (1322). As FIG. 13 shows, the detection process then proceeds to validation of the IMFP MIC as set forth above. If the link MIC is not valid, the detection process increments a "bad link MIC" counter and applies a security policy (1312). Otherwise, if the wireless management frame does not have the expected link and IMFP MICS, the detection process determines which MIC is missing. As FIG. 13 illustrates, if the link MIC is missing (1328), the detection process increments a "no link MIC" counter (1330) and applies one or more security policies (1312). Otherwise, the detection process increments a "no IMFP MIC" counter (1310). As FIG. 13 illustrates, the detection process may optionally validate the link MIC (1334) if the wireless management frame is a broadcast frame (1332).

A policy enacted by step 1312 can take multiple forms, and may depend on the type of validation failure that occurred, as well as the number of occurrences involving the same source or different MAC addresses within a given time interval. Some examples of policy include turning off the radio of an access point being spoofed (and potentially neighboring access points), directing neighboring access points to operate in a detector mode, causing the spoofed access point to terminate all connections with wireless clients, causing the spoofed access point to change the operating channel, querying the MIB of the spoofed access point, transmitting event notifications to a network administrator, changing the keys used for communication between infrastructure access points and wireless clients, directing one or more neighboring access points and/or detectors to attempt to locate the rogue system (e.g., by measuring the receive signal strength of received frames), and reporting the failure or combinations thereof to a network management system. Obviously this is not an exhaustive list and other policies could also be implemented.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. In a wireless access point having at least one link session key for securing management frames transmitted to at least one wireless client, the wireless access point further configured with at least one infrastructure management frame protection (IMFP) key, a method comprising:
   composing a class two subtype wireless management frame for transmission to one or more wireless clients;
   composing a class three subtype wireless management frame for transmission to the one or more wireless clients;
   generating a first message integrity check (MIC) with the at least one link session key corresponding to the one or more wireless clients;
   appending the first MIC to the class two subtype wireless management frame;
   appending the first MIC to the class three subtype wireless management frame;
   generating a second message integrity check (MIC) with the IMFP key;
   appending the second MIC to the class three subtype wireless management frame;
   transmitting the class two subtype wireless management frame with only the first MIC appended thereto to the one or more wireless clients;
   transmitting the class three subtype wireless management frame with the first and second MICs appended thereto to the one or more wireless clients; and
   transmitting the at least one link session key to the one or more wireless clients to enable the one or more wireless clients to authenticate the class three subtype wireless management frame.

2. The method as recited in claim 1 wherein the first and second MICs are contained in a MIC information element appended to the class three wireless management frame.

3. The method as recited in claim 1 wherein the link session key is a unicast session key unique to a given wireless client.

4. The method as recited in claim 1 wherein the link key is a broadcast group key corresponding to one or more wireless clients.

5. The method as recited in claim 1 wherein the wireless access point is further configured to automatically propagate an updated link session key to the one or more wireless clients.

6. The method as recited in claim 1 wherein the wireless access point is further configured to transmit the at least one link session key to the one or more wireless clients using Wireless LAN Context Control Protocol.

7. A wireless access point having at least one link key for securing management frames transmitted to one or more wireless clients, the wireless access point further configured with at least one infrastructure management frame protection (IMFP) key, comprising:
   a wireless network interface;
   one or more processors;
   a memory;
   a wireless access point application, stored in the memory, including instructions operable to cause the one or more processors and the wireless network interface to:
      compose a class two subtype wireless management frame for transmission to one or more wireless clients;
      compose a class three subtype wireless management frame for transmission to the one or more wireless clients;
      generate a first message integrity check (MIC) with the at least one link session key corresponding to the one or more wireless clients;
      append the first MIC to the class two subtype wireless management frame;
      append the first MIC to the class three subtype wireless management frame;
      generate a second message integrity check (MIC) with the IMFP key;
      append the second MIC to the class three subtype wireless management frame;
      transmit the class two subtype wireless management frame with only the first MIC appended thereto to the one or more wireless clients;
      transmit the class three subtype wireless management frame with the first and second MICs appended thereto to the one or more wireless clients; and
      transmit the at least one link session key to the one or more wireless clients to enable the one or more wireless clients to authenticate the class three infrastructure wireless management frame.

8. The wireless access point as recited in claim 7 wherein the first and second MICs are contained in a MIC information element appended to the class three infrastructure wireless management frame.

9. The wireless access point as recited in claim 7 wherein the link session key is a unicast session key unique to a given wireless client.

10. The wireless access point as recited in claim 7 wherein the link session key is a broadcast group key which corresponds to one or more wireless clients.

11. The wireless access point as recited in claim 7 wherein the wireless access point application is further operable to automatically propagate an updated link session key to the one or more wireless clients.

12. The wireless access point as recited in claim 7 wherein the wireless access point application is further operable to transmit the at least one link session key to the one or more wireless clients using Wireless LAN Context Control Protocol.

13. A wireless access point having at least one link session key for securing management frames transmitted to at least one wireless client, the wireless access point further configured with at least one infrastructure management frame protection (IMFP) key, comprising a controller, the controller comprising a central processing unit, the central processing unit comprising:
   means for composing a class two subtype infrastructure wireless management frame for transmission to one or more wireless clients;

means for composing a class three subtype wireless management frame for transmission to the one or more wireless clients;

means for generating a first message integrity check (MIC) with the at least one link session key corresponding to the one or more wireless clients;

means for appending the first MIC to the class two subtype wireless management frame;

means for appending the first MIC to the class three subtype wireless management frame;

means for generating a second message integrity check (MIC) with the IMFP key;

means for appending the second MIC to the class three subtype wireless management frame;

means for transmitting the class two subtype wireless management frame with only the first MIC appended thereto to the one or more wireless clients;

means for transmitting the class three subtype wireless management frame with the first and second MICs appended thereto to the one or more wireless clients; and means for transmitting the at least one link session key to the one or more wireless clients to enable the one or more wireless clients to authenticate the class three infrastructure wireless management frame.

14. The wireless access point as recited in claim 13 wherein the central processing unit further comprises means for automatically propagating an updated link session key to the one or more wireless clients.

15. The wireless access point as recited in claim 13 wherein the central processing unit further comprises means for transmit the at least one link session key to the one or more wireless clients using Wireless LAN Context Control Protocol.

* * * * *